(12) United States Patent
Cohen et al.

(10) Patent No.: US 7,260,738 B2
(45) Date of Patent: Aug. 21, 2007

(54) SYSTEM AND METHOD FOR SPLITTING AN IMAGE ACROSS MULTIPLE COMPUTER READABLE MEDIA

(75) Inventors: Jason Cohen, Seatac, WA (US); Ryan Burkhardt, Redmond, WA (US); Raj Jhanwar, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 793 days.

(21) Appl. No.: 10/172,862

(22) Filed: Jun. 17, 2002

(65) Prior Publication Data
US 2003/0233379 A1   Dec. 18, 2003

(51) Int. Cl.
*G06F 11/00* (2006.01)
(52) U.S. Cl. .......................................... 714/6; 382/114
(58) Field of Classification Search .................. 714/6, 714/38, 3; 382/114, 100, 173, 174; 705/517, 705/520; 707/104.1, 101, 102, 100
See application file for complete search history.

(56) References Cited

U.S. PATENT DOCUMENTS

| | | |
|---|---|---|
| 5,142,680 A | 8/1992 | Ottman et al. |
| 5,469,573 A | 11/1995 | McGill, III et al. |
| 5,555,416 A | 9/1996 | Owens et al. |
| 5,713,024 A | 1/1998 | Halladay |
| 5,732,265 A | 3/1998 | Dewitt et al. |
| 5,781,190 A | 7/1998 | Gorbet et al. |
| 5,794,052 A | 8/1998 | Harding |
| 5,813,008 A | 9/1998 | Benson et al. |
| 5,933,842 A | 8/1999 | Ross |
| 6,016,400 A | 1/2000 | Day et al. |
| 6,080,207 A | 6/2000 | Kroening et al. |
| 6,138,179 A | 10/2000 | Chrabaszcz et al. |
| 6,154,852 A | 11/2000 | Amundson et al. |
| 6,188,779 B1 * | 2/2001 | Baum .......................... 382/114 |
| 6,247,128 B1 | 6/2001 | Fisher et al. |
| 6,262,726 B1 | 7/2001 | Stedman et al. |
| 6,282,711 B1 | 8/2001 | Halpern et al. |
| 6,377,958 B1 * | 4/2002 | Orcutt ........................ 707/200 |
| 6,385,766 B1 | 5/2002 | Doran, Jr. et al. |
| 6,453,413 B1 | 9/2002 | Chen et al. |
| 6,512,526 B1 | 1/2003 | McGlothlin et al. |
| 6,532,474 B2 * | 3/2003 | Iwamoto et al. ......... 707/104.1 |
| 6,598,223 B1 | 7/2003 | Vrhel, Jr. et al. |
| 6,681,323 B1 | 1/2004 | Fontanesi et al. |
| 6,711,624 B1 | 3/2004 | Narurkar et al. |
| 2002/0174329 A1 | 11/2002 | Bowler et al. |

(Continued)

OTHER PUBLICATIONS

Zhang et al., "A Modeling Perspective of Image-Based Installation," Dell White Paper, pp. 1-13, Mar., 2002, U.S.A.

(Continued)

*Primary Examiner*—Nadeem Iqbal
(74) *Attorney, Agent, or Firm*—Senniger Powers

(57) ABSTRACT

A software tool and method in which a source image is split into and spans across two or more image pieces having a data structure which fits onto a computer readable medium having an available storage capacity which is smaller than the size of the source image. Also, software tool and method which combines two or more image pieces of a source image on a destination medium into a re-combined image having a data structure corresponding to the source image.

25 Claims, 9 Drawing Sheets

U.S. PATENT DOCUMENTS

2002/0188941 A1   12/2002  Cicciarelli et al.
2002/0194398 A1   12/2002  Bentley et al.
2003/0233379 A1*  12/2003  Cohen et al. ............... 707/200
2004/0070678 A1    4/2004  Toyama et al.
2004/0218902 A1   11/2004  Yanagita

OTHER PUBLICATIONS

White Paper, "Microsoft Windows 2000 Server—Remote Operating System Installation," Microsoft Corporation, pp.: i-iv, 1-41, 1999, U.S.A.

* cited by examiner

SYSTEM AND METHOD FOR SPLITTING AN IMAGE ACROSS MULTIPLE COMPUTER READABLE MEDIA

TECHNICAL FIELD

The present invention relates to the field of image spanning. In particular, this invention relates to a system and method for splitting a single file image into operationally usable pieces across multiple removable computer readable media.

BACKGROUND OF THE INVENTION

Software products are becoming increasingly large and frequently larger than the capacity of a single computer readable medium such as a magnetic or optical disk. As a result, such software products do not fit onto a single medium. In the past, when a copy of such a software product was needed, the product was split into two or more pieces wherein each piece was equal to or less than the capacity of the medium. The content of each piece was arbitrarily selected. Each piece was then copied onto a separate medium. To re-create the software program, the pieces on the separate medium were used to re-assemble the software program. When software programs are split in this manner, it is very difficult if not impossible to determine which files of the software program are stored on a particular medium.

Furthermore, the images of such software products do not fit onto a single medium. The prior art does not address splitting or spanning an image of a software program into two or more pieces wherein each piece of the image is equal to or less than the capacity of the medium so that each piece may be copied onto a separate medium. Also, the prior art is not able to re-create the software program from the pieces of the image. Furthermore, there is a need for splitting an image of a software program into two or more pieces wherein each piece of the image is equal to or less than the capacity of the media in such a way that it can be determined which files of the software program are stored on a particular medium.

For these reasons, a system and method for splitting images is desired to address one or more of these and other disadvantages.

SUMMARY OF THE INVENTION

The invention includes software image spanning to permit a single file image to be split into operationally usable pieces across multiple removable media. In particular, the invention includes software functionality that allows a single file image to be split into pieces that fits on multiple fixed sized removable media.

The invention contemplates many embodiments to optimally group necessary files on a common medium, and to allow files required to make a medium bootable to exist within a single image and to duplicate only necessary components on subsequent media.

Among the advantages of the invention would be allowing the image to be split and chained in a way that not only allows each image piece to be modified, updated or restored without being reassembled, but also allows the individual pieces of the image to be opened or mounted so that individual files within the image can be added to, removed from, or extracted from the image. Another advantage is the convenience of saving large images to multiple media.

Creating a way to specify which files are part of an image piece of the image that will be copied to a particular media allows for many important scenarios. For example, the scenarios include, but are not limited to, allowing files required to make a medium bootable to exist inside a first piece of the image and not take up duplicate space on other media; including all the files required by an application program in a first piece so that the application can initiate operation without changing media; or grouping component resources in a single piece so media changing is kept to a minimum.

In one form, the invention is a software tool which splits a source image into two or more image pieces, each of which fits onto a computer readable medium having an available storage capacity which is smaller than the size of the source image. The software tool comprises a selecting tool responsive to user input for designating which files of the source image to be included in each image piece, a splitting tool which groups the designated files into their corresponding image piece and a chaining tool which labels each of the image pieces.

In another form, the invention is a method of splitting a source image into two or more image pieces, each of which fits onto a computer readable medium having an available storage capacity which is smaller than the size of the source image. The method comprises designating which files of the source image to be included in each image piece and grouping the designated files into their corresponding image pieces.

In another form, the invention is a method of creating from a source image an image piece which fits onto a computer readable medium having an available storage capacity which is smaller than the size of the source image. The method comprises:
 specifying the size of the image piece;
 designating which files of the source image to be included in the image piece;
 creating the image piece from the designated files;
 writing a header for the image piece wherein the header corresponds to the designated files;
 writing a metadata for the image piece wherein the metadata corresponds to the designated files;
 copying priority data which corresponds to the designated files from the source image to the image piece;
 copying non-priority data from the source image to the image piece; and
 adding a signature to the image piece which signature corresponds to the contents of the image piece.

In another form, the invention is a computer readable medium having stored thereon a data structure representing a image piece of a source image comprising selected files of the source image, a header identifying the image piece as a portion of the source image, a metadata identifying the files of the image piece, priority data from the source image corresponding to the selected files, non-priority data from the source image, and a signature corresponding to the image piece.

In another form, the invention is a software tool having computer executable components for combining two or more image pieces of a source image into a re-combined image corresponding to the source image. Each of the image pieces is on a computer readable medium having an available storage capacity which is smaller than the size of the source image. The re-combined image is stored on a destination computer readable medium. The software tool comprises a copying tool, a combining tool and a chaining tool. The copying tool is responsive to user input for copying files of the image pieces onto the destination computer readable medium. The combining tool combines the copied files into the re-combined image on the destination computer readable medium. The chaining tool labels the re-combined image on the destination computer readable medium.

In another form, the invention is a method of combining two or more image pieces of a source image into a re-combined image corresponding to the source image. Each of the image pieces is stored on a computer readable medium having an available storage capacity which is smaller than the size of the source image. The re-combined image is on a destination computer readable medium. The method comprises:

copying files of the image pieces onto the destination computer readable medium in response to user input;
combining the copied files into the re-combined image on the destination computer readable medium; and
labeling the re-combined image on the destination computer readable medium.

In another form, the invention is a method of combining two or more image pieces of a source image into a re-combined image corresponding to the source image. Each of the image pieces is on a computer readable medium having an available storage capacity which is smaller than the size of the source image. The re-combined image is on a destination computer readable medium. The method comprises:

imaging the re-combined image from the image pieces;
writing a header for the re-combined image wherein the header corresponds to the files of the re-combined image;
writing a metadata for the image piece wherein the metadata corresponds to the files of the re-combined image;
adding a signature to the re-combined image which signature corresponds to the contents of the re-combined image.

In another form, the invention is a computer readable medium having stored thereon a data structure representing a re-combined image formed by combining two or more image pieces of a source image. The re-combined image corresponds to the source image, wherein each of the image pieces is stored on a computer readable medium having an available storage capacity which is smaller than the size of the source image. The re-combined image is on a destination computer readable medium. The data structure comprises a header identifying the re-combined image, a metadata identifying the files of the re-combined image, priority data from the image pieces, non-priority data from the image pieces, and a signature corresponding to the re-combined image.

In another form, the invention is a computer-readable medium having stored thereon a first image piece of a software image which first image piece can be combined with one or more other image pieces of the software image into a combined image which corresponds to the software image. The medium comprises an image of descriptive data of the software image and an image of file data of the software image.

In another form, the invention is a combined image including a first image piece of a software image and including a second image piece of the software image. The combined image comprises a header of the combined image, a first metadata of the first image piece, a second metadata of the second image piece, a first file data of file data of the first image piece, a second file data of file data of the second image piece and a signature of the combined image.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
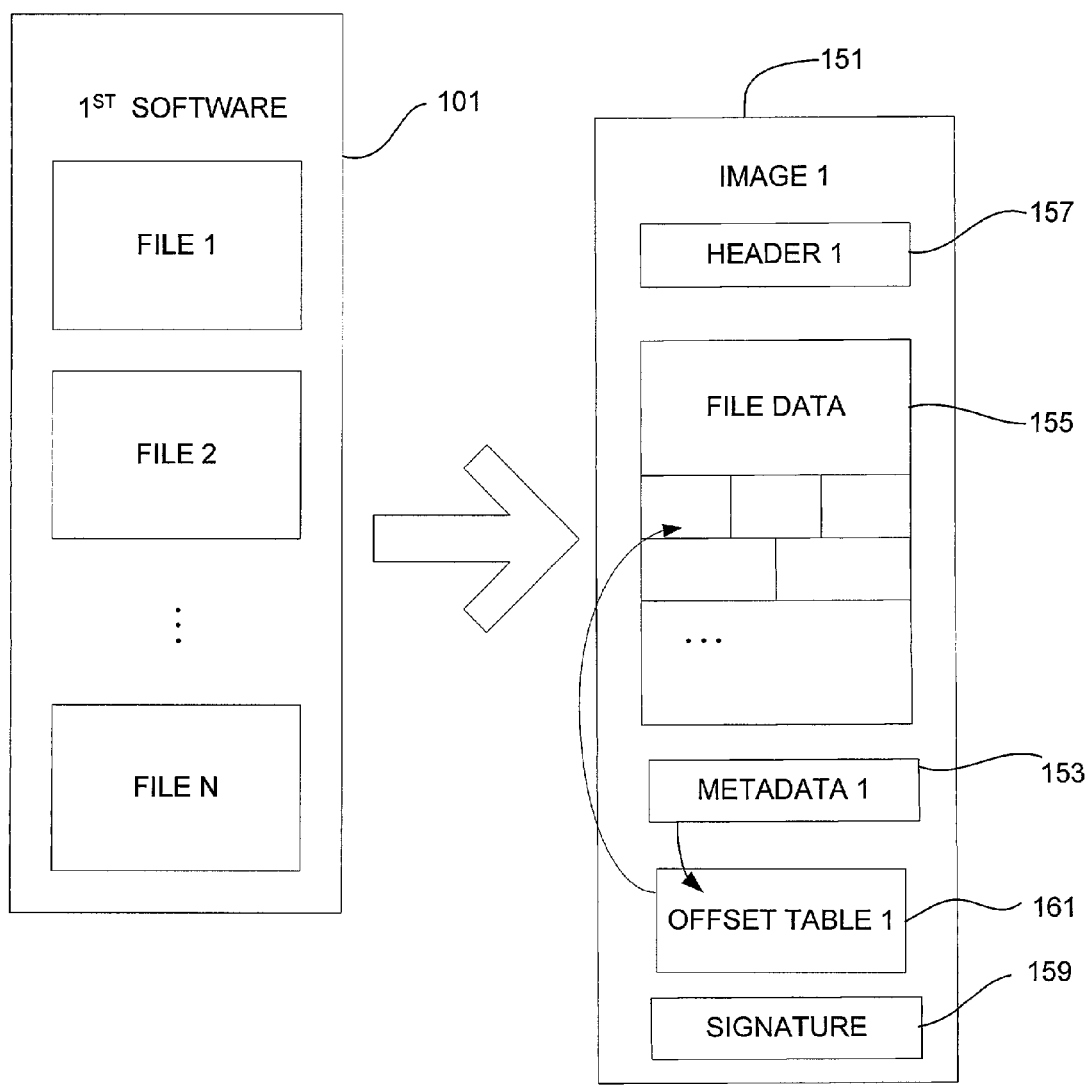
FIG. 1 is an exemplary diagram illustrating the conversion of a software program to a source image which can be split into image pieces according to the invention.

Referring first to FIG. 1, in order to permit splitting of software items (herein referred to as programs), each individual software program 101 is converted into a source image 151 including an image of descriptive data of the software 101 and an image of the file data of the software 101. "Images" and "imaging" as used herein is also referred to as "disk images," "disk imaging," "volume images" and/or "volume imaging."

The descriptive data of the software 101 includes information representing the layout of the source image 151 and is referred to as metadata 153. Essentially, metadata is information needed for a file or file system such as a file directory to represent the file. The metadata may include any one or more of the following: file names (short or long), attributes, file times (e.g., create/access/modify), compression formats, locations (e.g., directories), directory structures, security information (e.g., access control list (ACL)) and/or stream names. By some definitions and in certain contexts, metadata may be defined to include any information which is not file data and may be viewed as including a header, an offset table and/or a signature. In this disclosure, the header, offset table and signature are separately illustrated for clarity.

The file data 155 includes any binary file data that is not metadata including but not limited to the following: the actual binary data of a particular file, stream data and/or any data of significant size. In general, the image 151 is stored on a computer-readable medium as a data structure of the software 101. As will be noted below in greater detail, one purpose of the image 151 is that it can be split into two or more image pieces which can be re-combined onto a destination medium to re-create the source image. Image 151 also includes a header 157 identifying the image 151 and a signature 159 corresponding to the image 151.

In addition, the image 151 includes an offset table 161 including the following information for each file: a unique identification, location, size, any flags relating to the file and an optional hash of the file, as described below. As illustrated in FIG. 1, the metadata 153 points to the offset table 161 and the offset table 161 points to the file data 155. In particular, the metadata 153 has the unique identifier that can be found in the offset table 161. The offset table 161 includes the offset of the location of the file data in the image.

As shown in FIG. 1, the metadata 153 is positioned between the file data 155 and the offset table 161, which is one preferred embodiment of the layout of the image 151 according to the invention. The remaining figures illustrate the metadata between the header and the file data for convenience. In general, it is contemplated that the various information may be located in various places within the image so that the invention is not intended to be limited to the locations illustrated.

Figure 2:
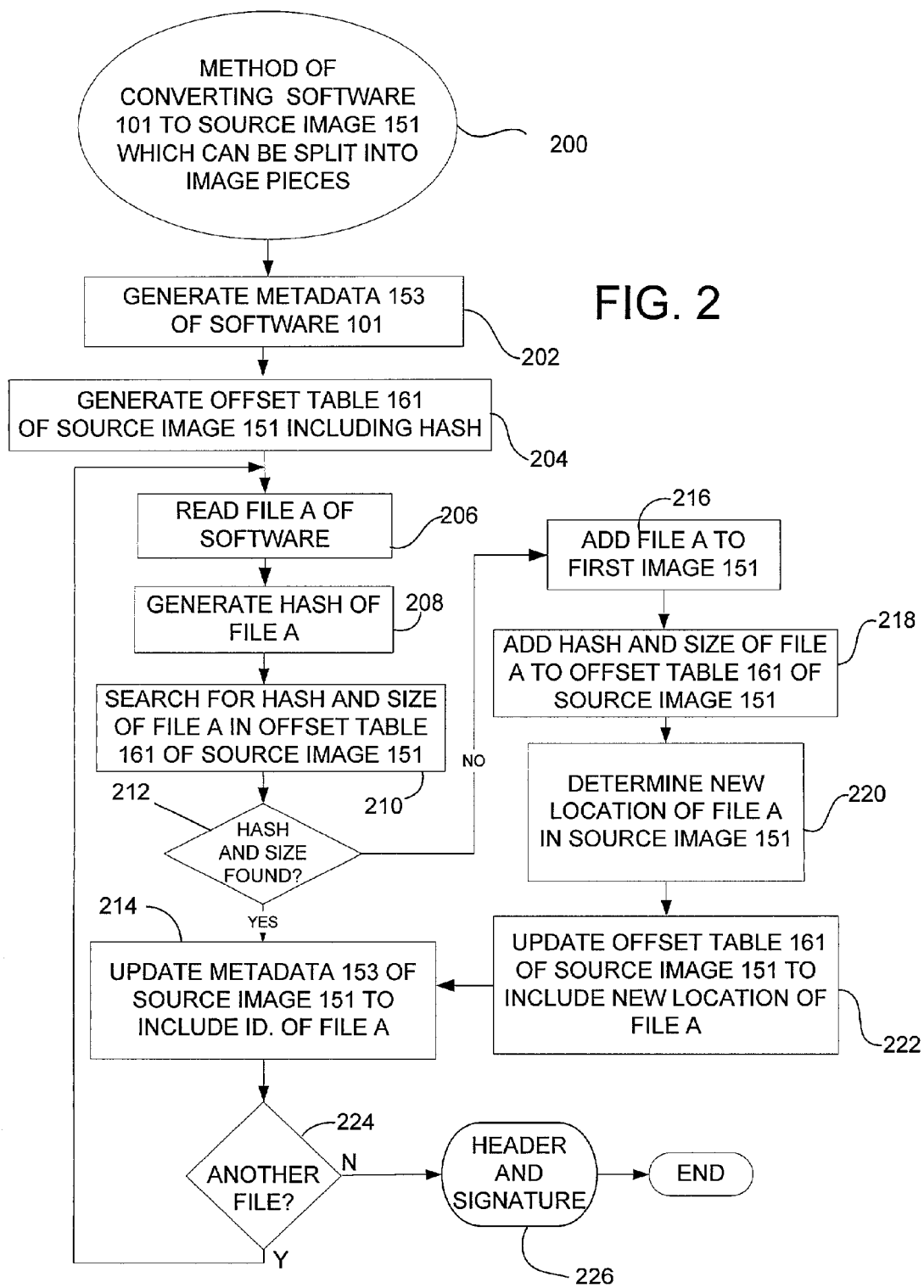
FIG. 2 is an exemplary flow chart illustrating operation of one method and tool according to the invention for creating a source image which can be split into image pieces.

FIG. 2 illustrates one optional method of converting the software 101 into the source image 151 having a data structure which can be split into image pieces, each on a separate medium so that the image pieces can be re-combined by imaging to recreate the source image from the image pieces. The method 200 of converting begins with generating metadata 152 of the software 101 at 202. Next, an offset table 161 of the source image 151 including a hash for each file is generated at 204. The hash list of the offset table 161 is a list of identifiers or other short unique descriptors of each of the files which are presently in the image 151. Initially, the hash list would be empty since no files have yet been added to the image 151.

At 206, a first file, called file A, of the software 101 is read and at 208 a hash of the read file A is generated. The hash of file A is an identifier of the information in the file A. At 210, a search in the offset table 161 for the hash and size of file A is conducted to determine whether or not the hash for file A (and its size) is within the offset table 161 of the source image 151. If found at 212, this indicates that file A is already a part of source image 151 and does not have to be added to the image 151. At this point at 214, the metadata 153 is updated to include the unique identification (ID) of file A which is already in the source image 151.

If it is determined at 212 that the hash and size of file A are not in the offset table 161 of the source image 151, the method proceeds to 216 to add file A to the source image 151 and at 218 the hash and size of file A are added to the offset table 161 of the source image 151. Next, at 220 the new location of the file A in the source image 151 is determined and at 222 the offset table 161 of the source image 151 is updated to include the new file location of file A. The method proceeds from 222 to 214 to update the metadata 153 of the source image 151 to include the unique identification of file A. Proceeding to 224, a determination is made as to whether any more files need to be read from the first software 101. If there is more than one file as part of the source software 101, the method returns to 206 to read the next file of the software 101. In the general case, A equals A+1 for each iteration of file reading. In the first iteration, A equaled 1 so that file 1 of the first software 101 was read. In the second iteration, A equals 2 so the second file is read and so on until all of the N files of the software 101 are read.

After all the files are read, the method proceeds to 226 to create a header and signature for the image 151 and then ends.

The method of FIG. 2 may be performed manually or with the aid of a tool or performed automatically with a tool programmed to provide the process of FIG. 2. As noted above and as illustrated in FIG. 1, the hash of the offset table 161 is optional for several reasons. First of all, it is not necessary to employ a hash list to determine what file data is a part of the image 151. However, using hash identifiers in a hash list simplifies and speeds up the process of determining whether or not an additional file needs to be copied to an image. Second, the hash list need not be a part of the image 151 and could be a temporary list used only during the process of converting the first software 101 into the source image 151. However, there are some advantages to maintaining a hash list of each mounted image so that as additional information is added to an image, or as an image is modified or updated, an up to date hash list of the image can be checked to determine whether or not the information that is being changed is redundant with other information that is already part of the image. In general, the metadata 152 and offset table 161 for image 151 are created in memory and saved to a file which is added to image 151. If hash identifiers are to be part of the offset table 161, the hash identifiers are added to the table when it is created in memory.

In cases where the first software or first image from which the image pieces were created do not have duplicate files, the use of a hash to avoid duplicate files is unnecessary.

Figure 3:
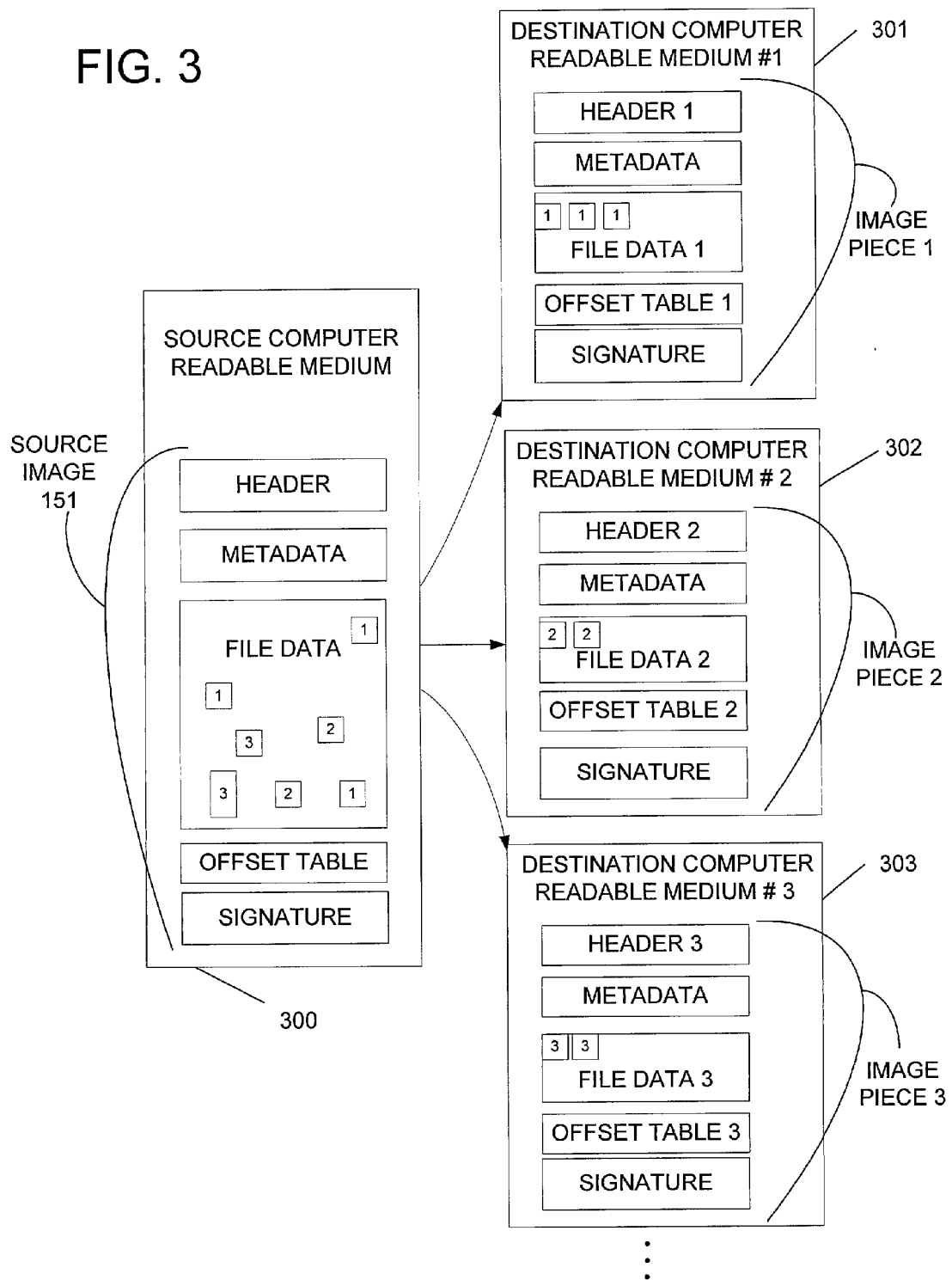
FIG. 3 is an exemplary embodiment of the invention illustrating schematically the layout of image pieces 1, 2 and 3 on destination computer readable media #1, #2 and #3, respectively, from a source image on a source computer readable medium.

FIG. 3 is an exemplary embodiment of the invention illustrating schematically the layout of usable image pieces 1, 2 and 3 on destination computer readable media #1, #2 and #3, respectively, split from the source image 151 on a source computer readable medium 300. In particular, it can be seen that media #1, #2 and #3, referred to by reference characters 301, 302 and 303, each have stored thereon a data structure which is a image piece (e.g., image pieces 1, 2 and 3, respectively) of the source image 151. In one form, it is contemplated that the media 301, 302, 303 have an available storage capacity which is smaller than the size of the source image 151. Thus, it would not be possible to place the complete source image 151 on any of the media 301, 302, 303. In other words, the invention allows the copying of the source image onto removable media 301–303 even though the complete source image 151 does not fit onto any one of the media. In another form, it is contemplated that the media may have an available storage capacity or an available storage capacity which is larger than the source image 151. In this case, the image pieces of the source image are stored on the media for convenience in restoring, modifying, updating or otherwise handling.

Each data structure on media 301–303 includes selected files of the source image 151. The particular files which are on each medium depend on user input and/or tool operation and are discussed in greater detail below. The data structure on each medium 301–303 also includes a header identifying each image piece as a portion of the source image 151. The data structure on each medium 301–303 also includes a metadata identifying the files of the image piece. In general, the metadata in each image piece may include all the files of the source image or just the files of that image piece. The data structure on each medium 301–303 also includes priority data from the source image 151 which corresponds to the selected files and non-priority data from the source image 151. This priority and non-priority data will be discussed below. In addition, the data structure on each medium 301–303 also includes a signature corresponding to the image piece and an optional offset table.

The data structure on any one or more of the media 301–303 also may include selected files which are a restorable portion of the source image 151 so that the image piece can be restored from the source image 151. For example, medium 301 may include a plurality of files, each of which can be opened or mounted so that each of the plurality of files within the image piece 1 of medium 301 could be modified, updated or restored independent of any changes to image pieces 302 or 303 and without reassembly of the image piece 1 with the other image pieces 2 and 3. Specifically, the selected files may include a bootable combination of files. As another example, image piece 302 may include all files required by an engine or application so that the image piece 302 is capable of initiating the operation of the engine or application of a computer. As another example, files may be grouped so that all files of a particular component end up in the same image piece. If a particular component has 100 files associated with it, one might want all the files to be in a particular image piece, although it may not matter which image piece has all the files. With this configuration, when the files for the particular component are needed, one need only use the particular image piece so that access to the other image pieces is unnecessary.

Figure 4:
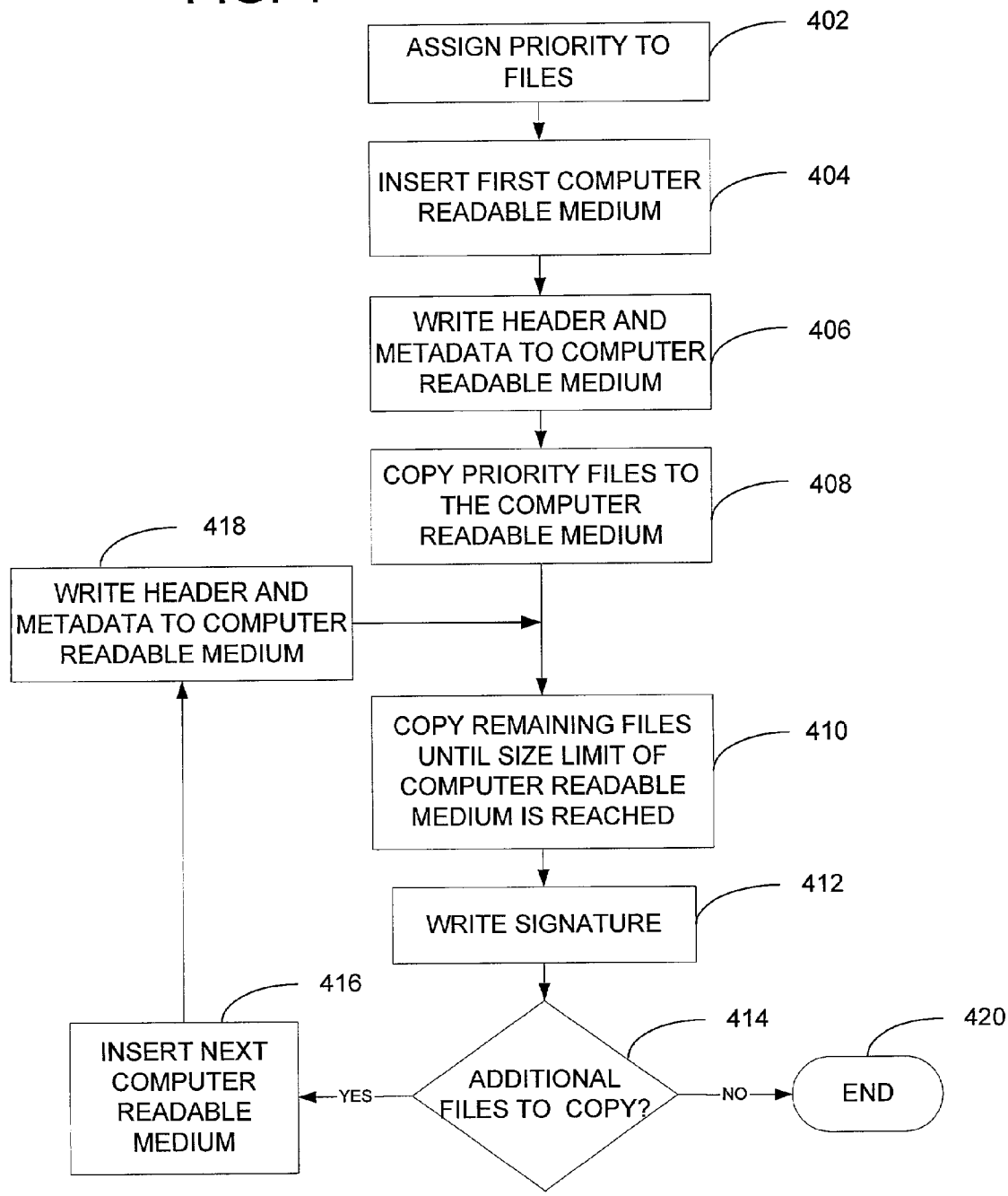
FIG. 4 is exemplary flow chart illustrating operation of a method and tool according to the invention for creating image pieces, each on a separate computer readable medium, from a source image according to the invention.

FIG. 4 is exemplary flow chart illustrating operation of a method and tool according to the invention for creating image pieces, each on a separate computer readable medium, from a source image according to the invention.

Initially, a user either manually or through the use of a software tool assigns priority to the files of the source image 151 at 402. The priority is based on the result required or desired, such as to create a bootable piece and/or to create a piece for use with an engine. For example, all the files needed for booting may be assigned to the first medium 301 on which the image piece #1 will be copied. Next, the media 301 on which the image piece #1 will be copied is inserted into a device (e.g. 154, 156, 160 of FIG. 8) which will copy the image piece onto the medium 301 at 404. At this point, the user or tool writes a header and metadata to the computer readable medium 301 at 406. Next, the files are copied onto the medium 301. In particular, priority files are first copied onto the medium 301 at 408 and then remaining files are copied onto the medium 301 at 410 until the size limit of the medium is reached (or until a designated size is reached, as noted below). At 412, a signature is written onto the medium along with an optional offset table. At 414 it is determined whether or not additional files need to be copied. In most cases, if only one medium with only image piece #1 has been generated, additional files need to be copied from the source image 151 since the medium 301 is smaller than the image. Thus, the method and tool proceed to 416 where a second medium 302 is inserted into the copying device. At 418, a header and metadata for the medium are written onto the second medium and the process proceeds to step 410 to continue copying remaining files onto the second medium 302 until the size limit of the second medium is reached. (If additional priority files need to be copied to the second medium, the process would proceed from 418 to 408. It is not necessary to have and swap the removable medium to split an image. For example, the image may be split on a hard drive into particular sized pieces because the particular size is the capacity of a removable medium. Thus, it would not be necessary to split the individual pieces; the pieces can remain on the hard drive and function as the software program. At a time when a copy of the software program is need, image pieces on the hard drive can be copied or transferred to individual media. This would be common in a case where a software tool for splitting images according to the invention would break the image into pieces equal to or less than the capacity of a CD-ROM, and then another tool could be used to burn those pieces to a CD.

After writing a signature at 412 and an optional offset table, the method proceeds to 414 again to determine if additional files need to be copied. If so, the method proceeds again to 416 and so on to copy any remaining files on any additional medium that may be needed or desired. If no additional files need to be copied, the process ends at 420.

As a specific example, FIG. 4 illustrates the operation of a software tool which splits a source image 151 into two or more image pieces (e.g., image pieces #1, #2 and #3) so that each image piece will fit onto a computer readable medium 301, 302, 303 having an available storage capacity which is smaller than the size of the source image 151, as noted above. In one form, the software tool and process according to the invention would include a selecting tool (accomplishing priority assignments at 402), a splitting tool (accomplishing file copying at 408 and 410) and a chaining tool (accomplishing labeling at 406, 412 and 418). The selecting tool would be used by the user and would be responsive to user input for designating which files of the source image 151 would be included in each image piece #1, #2 and #3 stored on media 301–303, respectively. The splitting tool then groups the files designated by the selecting tool under the user's control in accordance with the corresponding image piece which will include the file. Next, a chaining tool labels each of the image pieces. The chaining tool creates a unique header for each of the image pieces, a metadata file for each of the image pieces and a unique signature for each of the image pieces.

The software tool and process of the invention allows each of the image pieces to be independent of each other so that at least one of the image pieces is a restorable portion of the source image 151. In addition, this independent arrangement allows each image piece to be modified, updated, viewed, read or restored independently of the other image pieces and without reassembly of the image pieces. In particular, each of the image pieces is adapted to include a plurality of files, such that each image piece can be opened so that the information contained in the image piece can be read or mounted. As a result, each of the plurality of files within each image piece can be added to, removed from or extracted from the image piece independent of any changes to the other image pieces of the source image and without reassembly of the image pieces. As noted above, an image piece may be configured to be bootable so that the bootable combination of files are a unique portion of one of the image pieces. In other words, this minimizes files that take up duplicate space on the computer readable media 301–303 on which the image pieces are stored.

As noted above, the user or tool may determine to assign priority so that a particular image piece includes all the files which would be required by an application so that the particular image piece is capable of initiating operation of the application on a computer independent of the computer accessing the other image pieces of the source image 151. As another example, priority may be assigned so that related component resources are included on the specific image piece, such as image piece #1 on media 301, so that the source image 151 can be restored on a computer with a minimum amount of changing between the media 301 and the other media 302, 303. As another example, each of the image pieces may be part of a recovery media such that each of the image pieces may include a minimal bootable operating system.

FIG. 4 also illustrates a method of splitting the source image 151 into two or more image pieces so that each of which will fit onto a computer readable medium having an available storage capacity which is smaller than the size of the source image 151 itself. In this context, the method includes designating which files of the source image will be included in each image piece at 402 and grouping the designated files into their corresponding image pieces at 404 et seq. As part of the grouping, the image pieces are labeled by writing a header and metadata for the image piece at 406 or 418; by copying priority data which corresponds to the designated files from the source image 151 to the image piece at 408; and by copying non-priority data from the source image 151 to the image piece at 408. In addition, a signature and optional offset table are added to the image piece at 412. The signature and/or offset table corresponds to the contents of the image piece. It is contemplated that the grouping comprises creating the image piece by imaging the files from the source image 151 to the computer readable medium 301–303. Optionally, the user or tool may specify the size of each of the image pieces and/or specify which files of the source image will be included in each of the image pieces.

As another aspect of the invention, FIG. 4 illustrates a method of creating from a source image 151 an image piece #1, #2, #3 which will fit onto a computer readable medium 301, 302, 303 having an available storage capacity which is smaller than the size of the source image 151. In this method, the remaining files that are copied at 410 are limited to a specified size of the image piece as specified by a user or by a tool. Files of the source image 151 that will be included in the image piece are designated at 402 and the image piece is created at 408, 410 from the designated files. The remainder of the method is as noted above.

Figure 5:
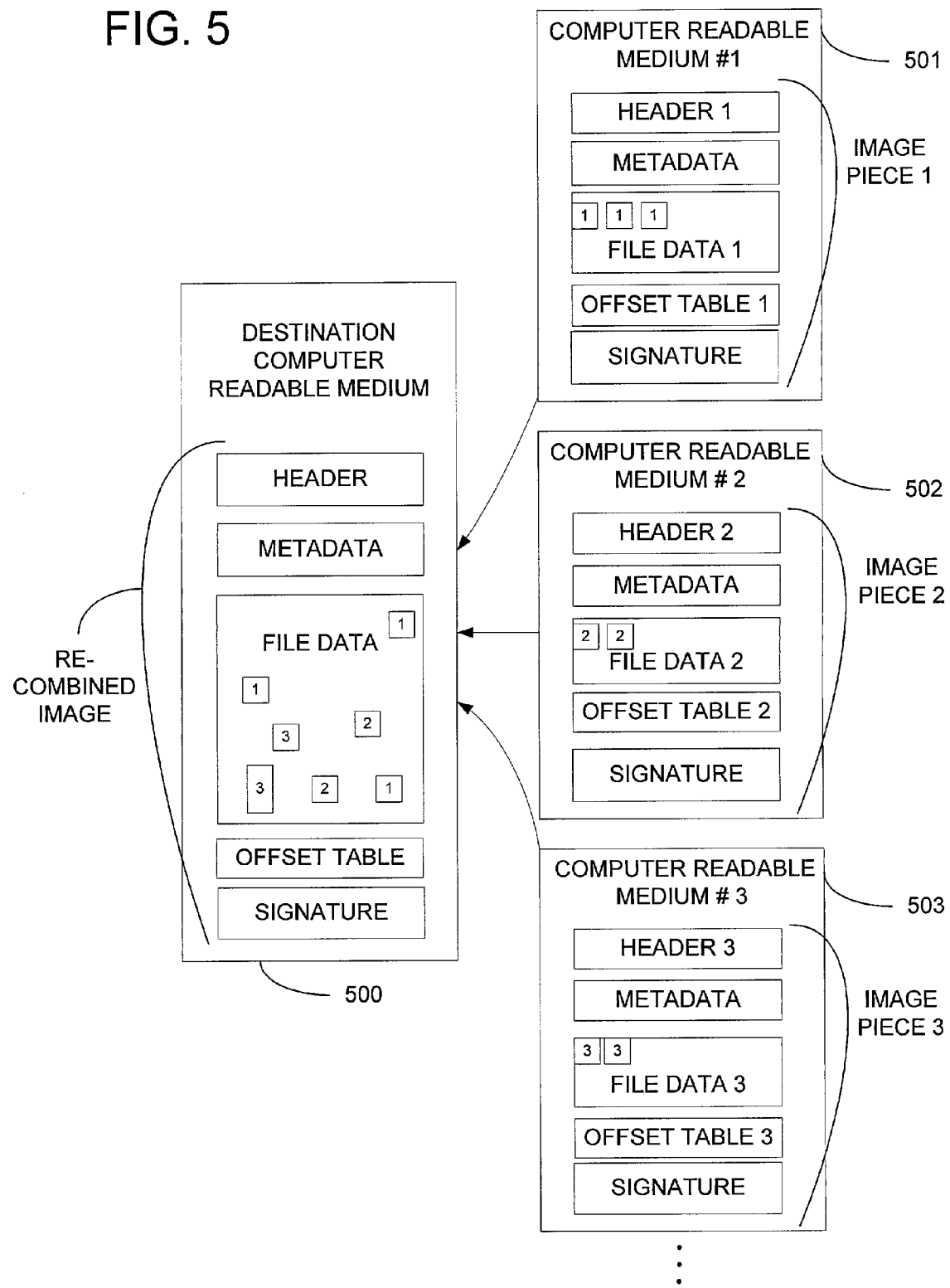
FIG. 5 is a block diagram illustrating an exemplary destination computer-readable medium on which a re-combined image corresponding to the source image may be created from image pieces which are each on a separate computer readable medium, according to the invention.

FIG. 5 is a block diagram illustrating an exemplary destination computer-readable medium (CRM) 500 on which a re-combined image corresponding to the source image 151 may be created from image pieces #1, #2, #3 which are each on a separate computer readable medium 501, 502, 503, respectively, according to the invention. In particular, FIG. 5 illustrates a computer readable medium 500 having stored thereon a data structure in the form of a re-combined image formed by combining image pieces #1, #2, #3 that originate from a source image 151 (see FIG. 3). Thus, the re-combined image corresponds to the source image 151. As noted with regard to FIG. 3, each of the image pieces #1, #2 and #3 is on a computer readable medium 301, 302, 303, respectively. Each medium has an available storage capacity which is smaller than the size of the source image 151. Even though the image may fit on an empty medium, there might be other data besides the image on there that forces us to span. Medium 500 may be referred to as a destination computer readable medium because it is the destination of the re-combined image to be created by combining the image pieces. As with the original source image 151, the re-combined image includes a header identifying the re-combined image, a metadata identifying the files of the re-combined image, priority data from the image pieces #1, #2, #3, non-priority data from the image pieces, and a signature corresponding to the re-combined image. One difference between the re-combined image and the source image is that the source image 151 originates from software 101 (see FIG. 1) whereas the re-combined image originates from image pieces #1, #2, #3 (see FIG. 5) which each originate from the source image 151 (see FIG. 3). Operationally, the re-combined image and the source image 151 are indistinguishable.

Figure 5A:
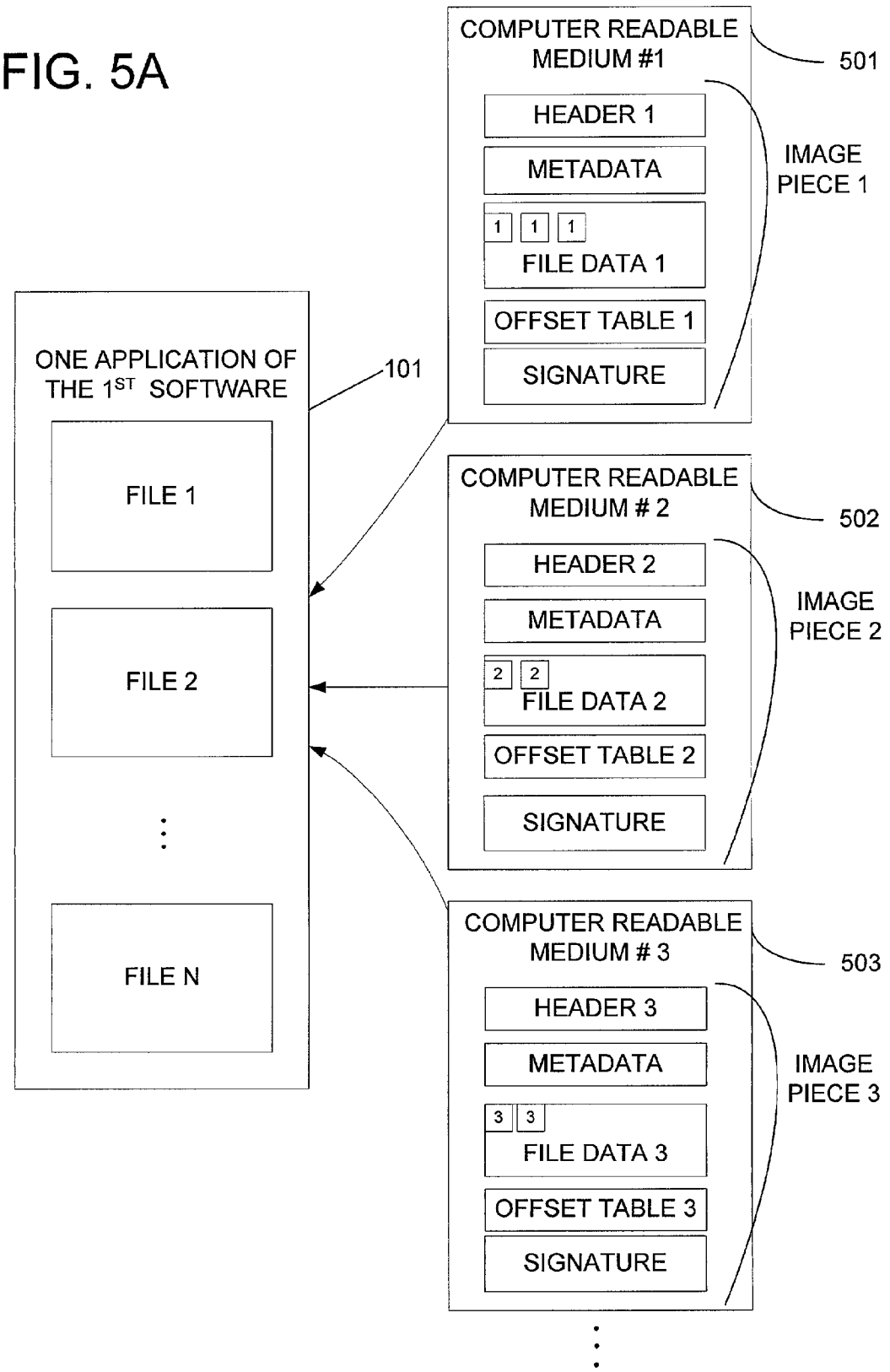
FIG. 5A is a block diagram illustrating that a source software program may be restored from image pieces of the image of the software program, which are each on a separate computer readable medium, according to the invention.

FIG. 5A is a block diagram illustrating that one or more applications of the source software program 101 may be restored from the image pieces 1, 2 and 3 of the image of the software program, which are each on a separate computer readable medium 501, 502, 503, according to the invention. For example, suppose the first software 101 has a word processing application and a spreadsheet application. Suppose further that the image 151 of the first software 101 includes five (5) image pieces. According to the invention, image pieces 1 and 2 may be designated to include the word processing application and image pieces 3, 4 and 5 may be designated to include the spreadsheet application Thus, the word processing application may be restored from image pieces 1 and 2 without the need for restoring the entire image 151 or without the need for restoring the spreadsheet application or without the need for combining all five image pieces. Similarly, the spreadsheet application may be restored from image pieces 3, 4 and 5 without the need for restoring the entire image 151, without the need for restoring the word processing application or without the need for combining all five image pieces.

Figure 6:
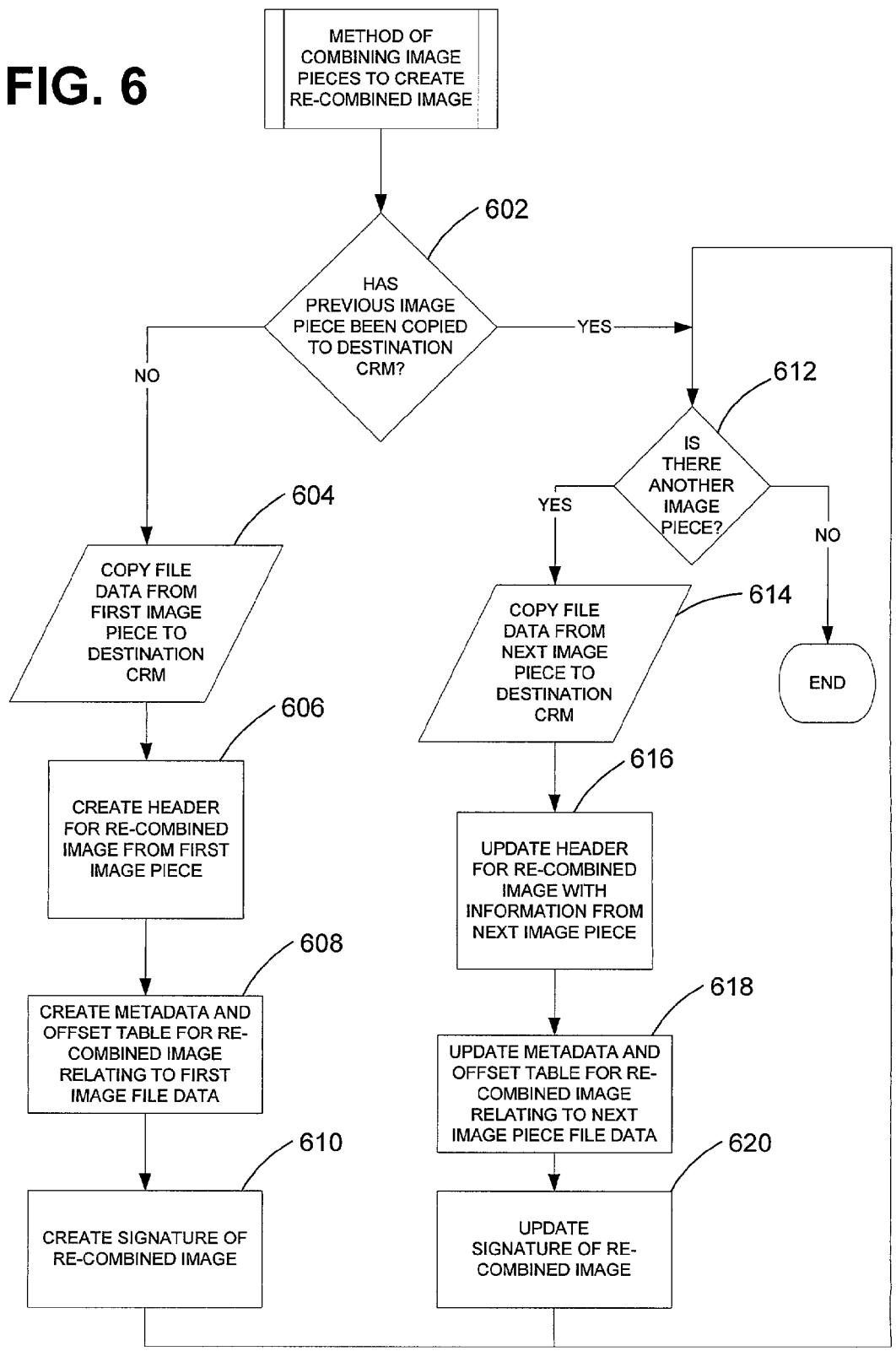
FIGS. 6 and 7 are flow charts of methods of combining image pieces to create a re-combined image, according to the invention.

FIG. 6 is a flow chart of a method and tool for combining image pieces to create a re-combined image corresponding to the source image 151 from which the image pieces were created, according to the invention.

In particular, FIG. 6 illustrates a method of combining image pieces to create a re-combined image or medium 500 as illustrated in FIG. 5 from image pieces #1, #2 and #3 on media 501, 502 and 503, respectively. A first determination of the method relates to whether or not a previous image piece has been copied to the destination medium 500. If a first image piece #1 is to be copied to the destination medium 500 and no previous image pieces have been copied to the destination medium 500, as determined at 602, the method proceeds to 604 to copy file data from the first image piece to the destination medium 500. Next at 606, a header is created for the re-combined image based on the information of the first image piece that has been copied to the re-combined image. At 608, metadata and an optional offset table are created for the re-combined image to identify and point to the information which is now a part of the re-combined image on the medium 500. At 610, a signature of the re-combined image is created and the process proceeds to step 612 to determine whether or not another image piece needs to be copied. If there are no other image pieces, the process ends. Otherwise, the process proceeds to 614 where the file data from the next image piece is copied to the medium 500. At 616, the header of the re-combined image is updated with information to include the files copied from the next image piece to the re-combined image on the destination media. At 618 the metadata and offset table of the re-combined image are updated relating to the newly added information. Finally at 620, the signature of the re-combined image is updated. The process again returns to 612 until all image pieces have been copied to the medium 500.

FIG. 6 (and also FIG. 7 as noted below) illustrate the operation of a software tool and/or method which combines two or more image pieces #1, #2, #3 of a source image 151 into a re-combined image on the destination medium 500. As a result, the re-combined image corresponds to the source image 151. As noted above, this is particularly applicable in the case where each of the image pieces #1, #2, #3 is on a computer readable medium 301–303 having an available storage capacity which is smaller than the size of the source image 151. The software tool and/or method has three aspects. First, a copying tool or process is responsive to user input or tool instructions for copying files of the image pieces onto the destination medium 500 (see FIG. 6, reference character 604). Second, a combining tool or process combines the copied files into the re-combined image on the destination medium 500 (see FIG. 6, reference character 614). Third, a chaining tool labels the re-combined image on the destination medium 500 (see FIG. 6, reference characters 606, 608, 616, 618). As noted above, one advantage of this process and tool is that related component resources may be included in the same image piece so that the source image 151 can be re-combined on the destination computer readable medium 151 with a minimum amount of changing between the computer readable media storing the image pieces #1, #2, #3 of the source image 151.

Viewed another way, FIG. 6 illustrates a method of combining three image pieces #1, #2, #3 of a source image 151 into a re-combined image on destination medium 500 by copying files of the image pieces onto the destination medium 500 in response to user input, by combining the copied files into the re-combined image on the destination medium 500 and by labeling the re-combined image on the destination medium 500. In this context, the labeling includes writing a header for the re-combined image from each image piece, writing metadata for the recombined image for each image piece, copying priority data from the image pieces to the recombined image, copying non-priority data from the image piece to the recombined image; and adding a signature to the recombined image which signature corresponds to the contents of the recombined image.

From an imaging perspective, FIG. 6 also illustrates a method of combining multiple image pieces #1, #2, #3 of a source image 151 into a re-combined image corresponding to the source image 151 by imaging the re-combined image from the image pieces, writing a header for the re-combined image wherein the header corresponds to the files of the re-combined image, writing a metadata for the re-combined image wherein the metadata corresponds to the files of the re-combined image and adding a signature to the re-combined image which signature corresponds to the contents of the re-combined image.

Figure 7:
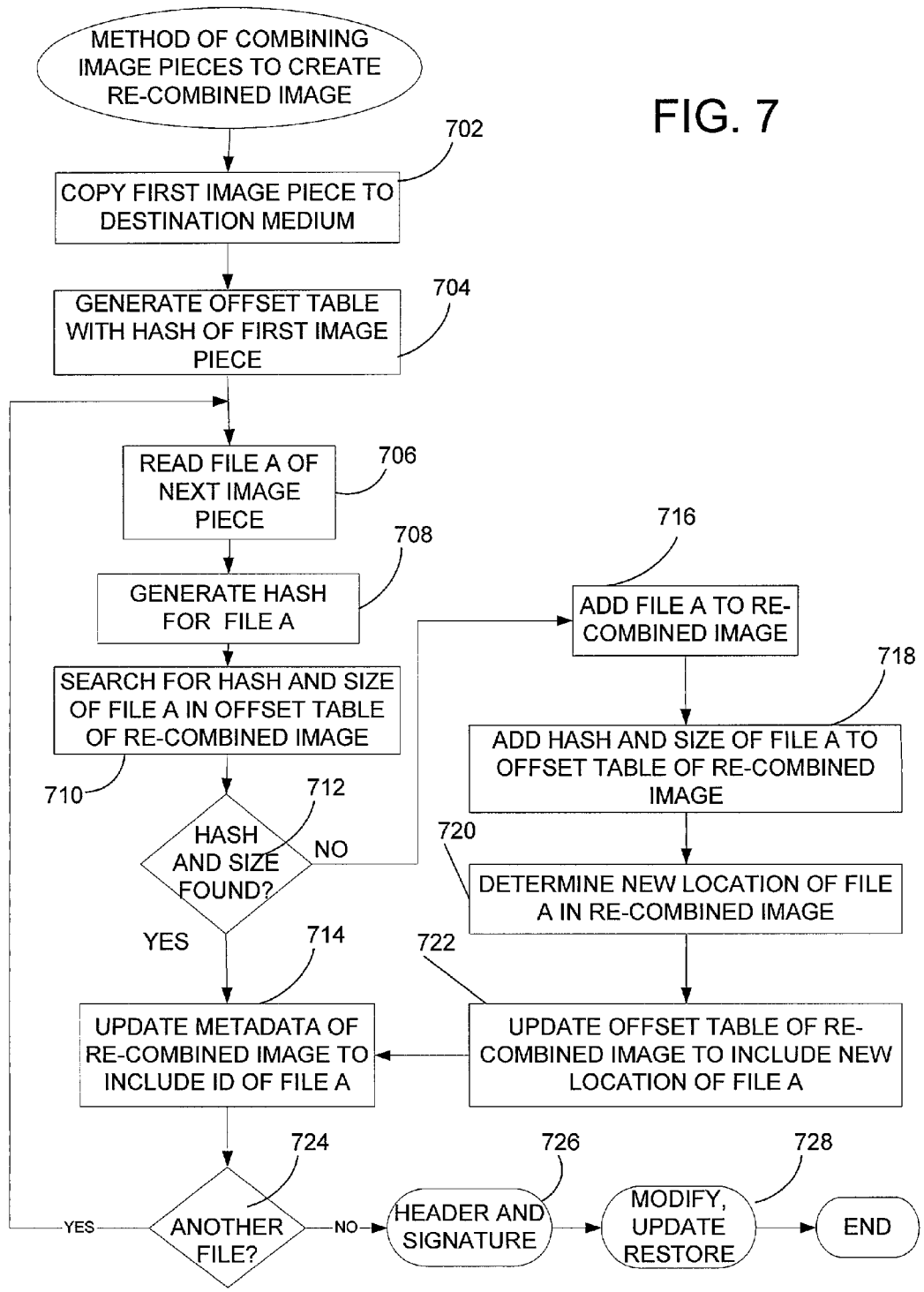

FIG. 7 is another flow chart of another method and tool for combining image pieces to create a re-combined image, according to the invention. Referring to FIG. 7, a method is illustrated of combining several image pieces into a single re-combined image which corresponds to a source image such as source image 151. Initially, the first image piece is copied to a destination medium at 702. In general, the first image piece forms an image to which files will be added to create a re-combined image corresponding to the source image 151. A combined offset table including the hash list of identifiers of all the files identified by the metadata of the first image piece is next generated at 704. The first image piece eventually becomes the re-combined image after all other image pieces are added to it. Thus, the first image piece (and anything added to it) is referred to as the re-combined image during the process of adding the other image pieces to the first image piece.

The remainder of the substantive portion of the method illustrated in FIG. 7 of adding the other image pieces to the first image piece corresponds to the substantive portion of the method of FIG. 2. In particular, each file in the next image is read at 706, a hash for each file is generated at 708, and at 710 a search for the hash and size of the read file is made within the hash list of the offset table of the re-combined image (initially, the first image piece). If at 712 the hash and size of the read file are in the offset table indicating that the file data is part of the re-combined image, the metadata of the recombined image is updated at 714 to include the unique identification of the file in the re-combined image. If at 712 the hash of the read file is not in the hash list, the file is added to the recombined image at 716, the hash and size of the file are added to the offset table of the recombined image at 718, the new location of the file is determined at 720 and the offset table of the image is updated to include the new location of the new file at 722. Next, the metadata of the image is updated at 714 to include the unique identification of the file. If the hash and size of the read file are found in the offset table, processing also continues at 714. This is done for each file of the next image. When all the files of all image pieces have been considered, as determined at 724, a header and signature of the recombined image is created at 726 and the re-combined image now becomes the source image from which the image pieces were created. FIG. 7 also illustrates at 728 that file data of the re-combined image can be modified, updated or restored.

Figure 8:
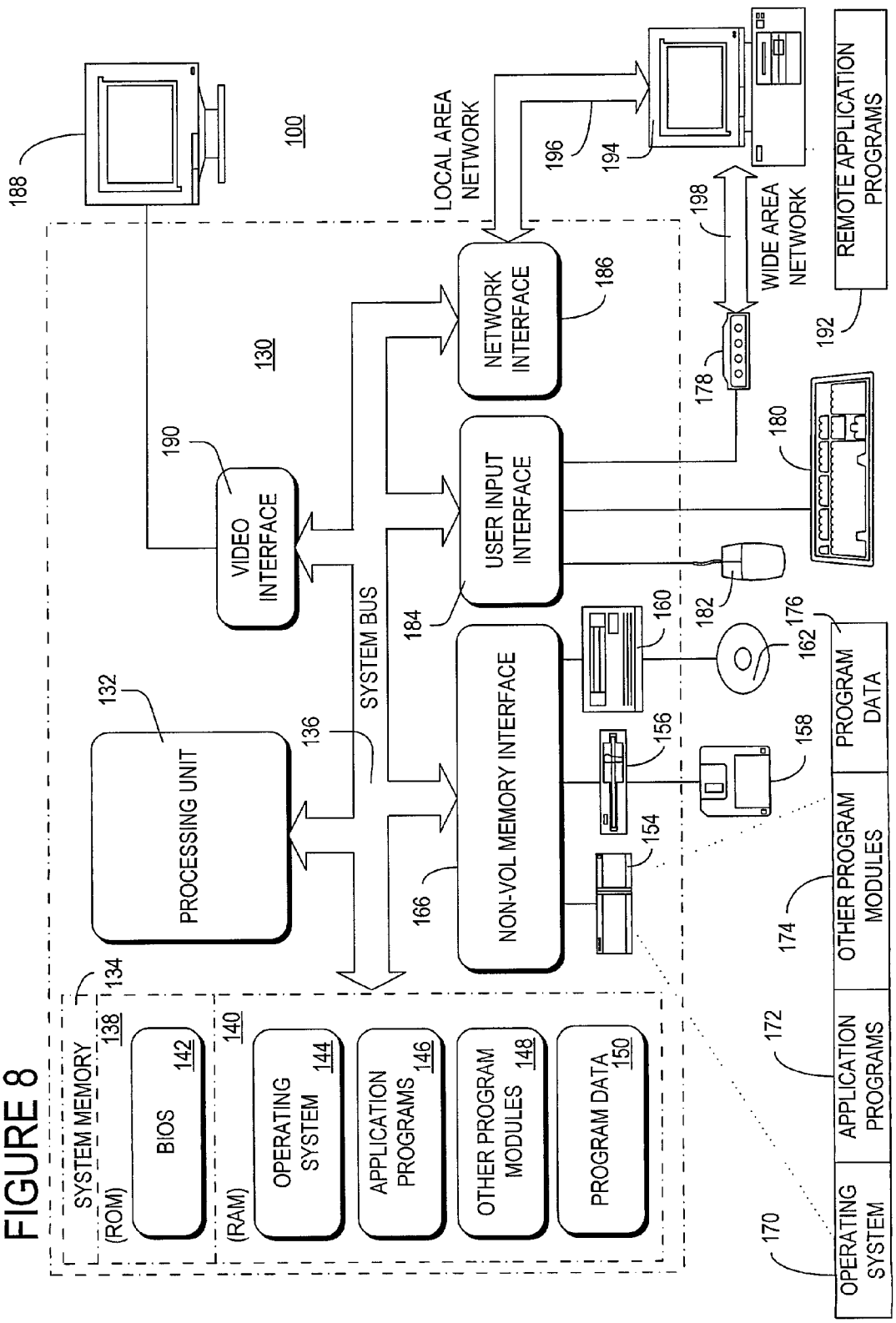
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. For example, such a device may employ or may be used to create a source image, an image piece and/or a recombined image. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 2 to convert the software program 101 into the source image 151. In addition, computer 130 executes computer-executable instructions such as those illustrated in FIG. 4 to create image pieces #1, #2, #3 on media 301–303, respectively. In addition, computer 130 executes computer-executable instructions such as those illustrated in FIGS. 6 and 7 to create a re-combined image from the image pieces.

The following examples illustrate the invention. In this example, an exemplary image corresponds to an operating system (OS) and one or more application programs. The size of the exemplary image exceeds the available storage capacity of a single storage medium such as a CD-ROM. As such, the exemplary image spans a set of multiple CD-ROMs according to the invention. The first CD-ROM in the set (e.g., image piece #1 in FIG. 5A) includes any files needed to boot into an environment for installing the OS of the image to the destination medium. In addition, the first CD-ROM in the set includes any files needed to initiate setup of the OS and/or the application programs of the exemplary image. Each of the remaining CD-ROMs in the set (e.g., image piece #2 and image piece #3 in FIG. 5A) corresponds to components of the OS or the application programs. The files for each component are grouped and stored on these remaining CD-ROMs. In this example, in response to a request for a specific component of the exemplary image, the re-combining software of the invention restores the requested component from the image piece corresponding to the requested component directly to the destination computer without re-combining all the image pieces.

In a further example, the user may later request to add a component that was not installed initially. The user installs the requested component by accessing the image piece that corresponds to the requested component. In this example, the user mounts the CD-ROM and accesses the files that need to be installed.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A software tool stored on a computer storage medium which splits a source image into two or more image pieces, each of which fits onto a computer readable medium having an available storage capacity which is smaller than the size of the source image, said software tool comprising:
   a selecting tool responsive to user input for designating which files of the source image to be included in each image piece;
   a splitting tool which groups the designated files into their corresponding image piece, wherein each of the image pieces is adapted to include a plurality of files, each of which can be opened or mounted so that each of the plurality of files within each image piece can be added, removed or extracted from the image piece independent of any changes to the other image pieces of the source image and without reassembly of the image pieces; and
   a chaining tool which labels each of the image pieces.

2. The tool of claim 1 wherein each of the image pieces is adapted to be independent of each other and comprises a restorable portion of the source image so that the image piece can be modified, updated or restored without reassembly of the image pieces.

3. The tool of claim 1 wherein one or more of the image pieces includes a bootable combination of files.

4. The tool of claim 3 wherein the bootable combination of files are a unique portion of one of the image pieces so that the files do not take up duplicate space on the computer readable medium on which the image piece is stored.

5. The tool of claim 1 wherein each of the image pieces includes all files required by a particular application so that the one image piece is capable of initiating operation of the particular application.

6. The tool of claim 5 wherein the particular application is a setup engine so that the one image piece is capable of initiating setup.

7. The tool of claim 1 wherein related component resources are included on a particular one of the image pieces so that the source image can be restored on a computer with a minimum amount of changing between the computer readable media storing the image pieces of the source image.

8. The tool of claim 1 wherein the chaining tool creates a unique header for each of the image pieces and a metadata file for each of the image pieces.

9. The tool of claim 1 wherein undesignated files of the image are stored as part of any of the image pieces until a limit for the size of the computer readable medium of the image piece is reached.

10. The tool of claim 1 wherein the chaining tool creates a unique signature for each of the image pieces.

11. The tool of claim 1 wherein each of the image pieces is part of a recovery media and wherein each of the image pieces includes a minimal bootable operating system.

12. A method of splitting a source image into two or more image pieces, each of which fits onto a commuter readable medium having an available storage capacity which is smaller than the size of the source image, said method comprising:
   designating which files of the source image to be included in each image piece;
   grouping the designated files into their corresponding image pieces; and
   labeling the image pieces, including:

writing a header for the image piece wherein the header corresponds to the designated files;

writing a metadata for the image piece wherein the metadata corresponds to the designated files;

copying priority data which corresponds to the designated files from the source image to the image piece;

copying non-priority data from the source image to the image piece; and adding a signature to the image piece which signature corresponds to the contents of the image piece.

13. The method of claim 12 wherein said grouping comprises creating the image piece by copying the files from the source image to the computer readable medium of the image piece.

14. The method of claim 12 wherein said designating comprises specifying the size of each of the image pieces and specifying which files of the source image to be included in each of the image pieces.

15. The method of claim 12, wherein one or more computer readable media have computer-executable instructions for performing the method of claim 12.

16. A method of creating from a source image an image piece which fits onto a computer readable medium having an available storage capacity which is smaller than the size of the source image, said method comprising:

specifying the size of the image piece;

designating which files of the source image to be included in the image piece;

creating the image piece from the designated files;

writing a header for the image piece wherein the header corresponds to the designated files;

writing a metadata for the image piece wherein the metadata corresponds to the designated files;

copying priority data which corresponds to the designated files from the source image to the image piece;

copying non-priority data from the source image to the image piece; and adding a signature to the image piece which signature corresponds to the contents of the image piece.

17. A software tool stored on a computer storage medium having computer executable components for combining two or more image pieces of a source image into a re-combined image corresponding to the source image, wherein each of the image pieces is on a computer readable medium having an available storage capacity which is smaller than the size of the source image, and wherein the re-combined image is stored on a destination computer readable medium, said software tool comprising:

a copying tool responsive to user input for copying files of the image pieces onto the destination computer readable medium;

a combining tool which combines the copied files into the re-combined image on the destination computer readable medium; and a chaining tool which labels the re-combined image on the destination computer readable medium.

18. The tool of claim 17 wherein related component resources are included on the same image piece so that the source image can be re-combined on the destination computer readable medium with a minimum amount of changing between the computer readable media storing the image pieces of the source image.

19. A method of combining two or more image pieces of a source image into a re-combined image corresponding to the source image, wherein each of the image pieces is stored on a computer readable medium having an available storage capacity which is smaller than the size of the source image, and wherein the re-combined image is on a destination computer readable medium, said method comprising:

copying files of the image pieces onto the destination computer readable medium in response to user input;

combining the copied files into the re-combined image on the destination computer readable medium; and labeling the re-combined image on the destination computer readable medium.

20. The method of claim 19 wherein said labeling comprises:

writing a header for the recombined image from each image piece;

writing a metadata for the recombined image for each image piece;

copying priority data from the image pieces to the recombined image;

copying non-priority data from the image piece to the recombined image; and adding a signature to the recombined image which signature corresponds to the contents of the recombined image.

21. The method of claim 19 wherein said grouping comprises creating the image piece by imaging the files from the source image to the computer readable medium of the image piece.

22. The method of claim 19 wherein said designating comprises specifying the size of each of the image pieces and specifying which files of the source image is included in each of the image pieces.

23. The method of claim 19, wherein one or more computer readable media have computer-executable instructions for performing the method of claim 18.

24. A method of combining two or more image pieces of a source image into a re-combined image corresponding to the source image, wherein each of the image pieces is on a computer readable medium having an available storage capacity which is smaller than the size of the source image, and wherein the re-combined image is on a destination computer readable medium, said method comprising:

imaging the re-combined image from the image pieces;

writing a header for the re-combined image wherein the header corresponds to the files of the re-combined image;

writing a metadata for the image piece wherein the metadata corresponds to the files of the re-combined image;

adding a signature to the re-combined image which signature corresponds to the contents of the re-combined image.

25. The method of claim 24 wherein one or more computer readable media have computer-executable instructions for performing the method of claim 18.

* * * * *